US007606536B1

(12) United States Patent
Koenck et al.

(10) Patent No.: US 7,606,536 B1
(45) Date of Patent: Oct. 20, 2009

(54) TEMPORAL CO-SITE INTERFERENCE REDUCTION

(75) Inventors: Steven E. Koenck, Cedar Rapids, IA (US); Demetri Tsamis, Cedar Rapids, IA (US); Roger A. Dana, Marion, IA (US); Joel M. Wichgers, Urbana, IA (US); David A. Gribble, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 649 days.

(21) Appl. No.: 11/396,729

(22) Filed: Apr. 3, 2006

(51) Int. Cl.
*H04B 1/44* (2006.01)

(52) U.S. Cl. ............................ 455/78; 370/229; 455/73

(58) Field of Classification Search ................. 370/201, 370/278, 282, 334; 455/63, 78, 79, 83, 69, 455/73, 80

See application file for complete search history.

(56) References Cited

U.S. PATENT DOCUMENTS 6,944,437 B2 * 9/2005 Yang et al. .................. 455/323
7,027,989 B1 * 4/2006 Tapadar et al. .............. 704/270
7,395,084 B2 * 7/2008 Anttila ..................... 455/552.1
7,408,898 B1 * 8/2008 Brown ........................ 370/328
2005/0075139 A1 * 4/2005 Shapira .................. 455/562.1
2005/0111432 A1 * 5/2005 Ekstrom et al. ............. 370/350
2007/0037595 A1 * 2/2007 Shpak ....................... 455/509

* cited by examiner

*Primary Examiner*—Chi H Pham
*Assistant Examiner*—Weibin Huang
(74) *Attorney, Agent, or Firm*—Daniel M. Barbieri

(57) ABSTRACT

The present invention is a method and system for managing a transmitter located in close proximity to a sensitive receiver. In an exemplary embodiment, the method may include recognizing incomplete receive operations on frequencies that may be affected by co-site transmit operations. Further, the method may include detecting the beginning of a speech message and delaying the speech message up to a selected maximum amount of time. The speech message may be delayed to correspond to required communications performance, allowing receive and transmit operations to be coordinated and thus, reducing the possibility of the receiver to be interrupted or affected by the transmitter operating on a relatively nearby frequency.

25 Claims, 4 Drawing Sheets

TEMPORAL CO-SITE INTERFERENCE REDUCTION

FIELD OF THE INVENTION

The present invention relates generally to the field of radio communications for aircraft, and more particularly, to a method and system allowing for reduction of co-site interference between a radio transmitter located in close proximity to a radio receiver.

BACKGROUND OF THE INVENTION

A long standing challenge for radio systems in general, and aircraft communication systems in particular, is management of high-powered transmitters located in close proximity to sensitive receivers. Such close proximity of transmitters and receivers often causes interference, a condition generally labeled as co-site interference. A commonly employed method to manage co-site interference is to physically separate the transmit antennas from the receive antennas as much as possible, as well as to shield, isolate, and separate transmit and receive electronics that are simultaneously operating. However, even with the best physical separation offered on a platform like an aircraft, it is not uncommon for a receiver to be interrupted or affected by a co-site transmitter, especially those operating on a relatively nearby frequency.

An additional increasingly important problem in avionics voice communications is congestion, where there is so much voice communication activity that it is difficult for users in the area of an airport to access a particular communication channel. While it is important for the flight crews in all aircraft to be able to hear and talk to Air Traffic Control and the flight crew of every other aircraft in the vicinity of an airport, busy airports may have so many aircraft in the area that there is insufficient capacity on the single channel for all of the communications to be completed.

A contributing factor to the undesired co-site interference is the uncoordinated nature of receive and transmit operations. Federated communication subsystems are commonly employed in avionics communication systems and often provide each avionics function with its own processor thereby allowing each processor to essentially work independently. Further, such communication subsystems typically require the flight crew to be the integrator of data and the manager of all of the supporting subsystems. Thus, the independent nature of a federated communication system limits its capabilities, since it does not allow receive and transmit operations of multiple waveforms to be simultaneously coordinated and managed.

Therefore, it would be desirable to provide a method and system for coordinating receive and transmit operations of multiple simultaneous waveforms thereby providing an integrated system for managing the operations, and thus reducing interference between a transmitter located in close proximity to a receiver. Furthermore, it would be desirable to utilize the available capacity of a particular voice channel more efficiently without requiring a change to the existing ground or aircraft infrastructure.

SUMMARY OF THE INVENTION

In accordance with a first aspect of the present invention, a method for coordinating receive and transmit operations is provided. In such aspect, the method may include recognizing an incomplete receive path operation on a frequency that may be affected by one or more simultaneous transmit operations. Further, the method may include detecting the beginning of the speech message and delaying transmission of the speech message for a selected amount of time. The speech message may be delayed to correspond to required communications performance if the transmit operation is expected to interfere with at least one receive operation. This allows receive and transmit operations to be coordinated, and thus reduces the possibility that the receiver might be interrupted or affected by the transmitter.

In accordance with a further aspect of the present invention, an additional method for coordinating receive and transmit operations is disclosed. In the present aspect, the method may include recognizing an incomplete receive path operation on a frequency that may be affected by a transmit operation (e.g., an adjacent frequency). Further, such method may involve detecting an activation of a transmitter. A radio frequency (RF) power amplifier may be disposed within the transmitter for amplifying a modulated speech analog signal. In addition, the method may include delaying the activation (keying) of the RF power amplifier for a time up to a predetermined maximum amount before transmission of the modulated speech analog signal begins.

In accordance with an additional aspect of the present invention, a system for managing one or more transmitters located in close proximity to one or more sensitive receivers is provided. The system may include a transmitter for transmitting a modulated speech analog signal. For instance, the transmitter may include an RF power amplifier for amplifying a modulated speech analog signal. In such system, the speech analog signal is delayed a selected amount of time up to a predetermined maximum, and the speech rate is increased without shifting the speech pitch. This would allow receive and transmit operations to be coordinated, to minimize the interference between the transmitter and the receiver when located in close proximity to each other. This would also reduce the effective amount of time that the message occupies the channel to improve the utilization of the channel in congested conditions.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

It is contemplated that the radio communication system described herein may be implemented using software defined radio technology. Software defined radios perform signal processing and communication control for voice and data waveforms using analog to digital (ADC) and digital to analog (DAC) signal conversion, digital signal processing, and programmed computers to implement the behavior and characteristics of the communication waveforms. The method described herein for reducing co-site interference by temporally shifting (e.g., delaying) transmissions utilizes delay periods that are consistent with the total system performance (TSP) operational requirements. TSP requirements for aircraft operations are being defined in terms of the required communications performance (RCP), required surveillance performance (RSP), and required navigation performance (RNP) as specified by aviation regulatory agencies. The transmit time delays proposed herein represent examples that may be acceptable for VHF voice communications for aircraft. Delay periods for other applications would be dependent upon their required performance. The innovation is applicable to all transmit communications, including both voice and data.

Figure 1:
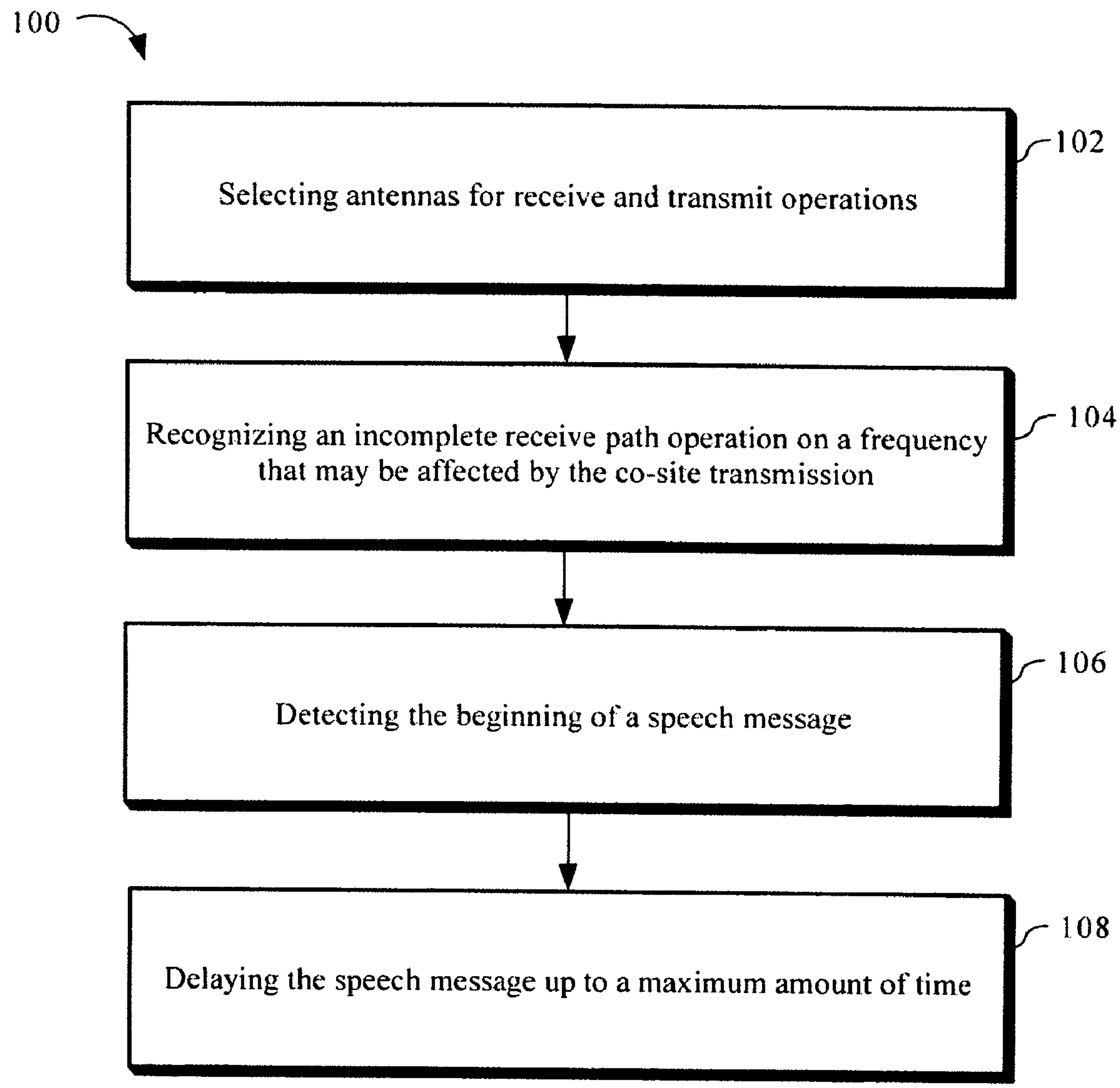
FIG. 1 is a flow diagram of a method for coordinating receive and transmit operations in accordance with an exemplary embodiment of the present invention.

Referring to FIG. 1, a method 100 for coordinating receive and transmit operations is provided. In an exemplary embodiment, the method 100 may include selecting antennas for receive and transmit operations 102. For instance, selection of optimal antennas may include evaluating receive-transmit isolation, link margin, priority, frequencies, and like factors which may influence the ability of the selected antennas and their associated electronics to perform the desired operations.

In an embodiment, the method 100 includes recognizing an incomplete receive path operation that may be affected by interference from a transmit operation 104. The transmit operation may cause interference to all frequencies within a band or group of frequencies that are near the transmit frequency. It may also cause interference to many other frequencies, including for example, frequencies that are harmonically related to the transmit frequency, frequencies that are at or harmonically related to any intermediate frequencies (IF) used by the transmit or receive electronics, or frequencies that are at or harmonically related to any frequencies used by various receiver electronics components (e.g., processor clocking oscillators). Alternatively, with higher performance receive filters, the receive frequency may be a frequency that is so close to the desired transmission frequency (e.g., adjacent frequency) that even the high performance receive filter is unable to provide sufficient attenuation of the nearby transmission signal due to its large magnitude. Recognition of an incomplete receive path operation may be accomplished in a number of ways depending on the type of communication that is being received. For example, if the received communication is a voice transmission, the received RF and analog signal will have certain well known characteristics. These characteristics include the phenomenon known as quieting, whereby the magnitude of the RF carrier is large relative to random noise, and a receiver with a gain control of some type that is tuned to that carrier frequency will have a reduced noise output that can be recognized by appropriate signal processing circuits.

Another characteristic of an ongoing voice communication signal is the analog speech waveform, which is characterized by the presence of frequencies between about 300 Hz. and 3 KHz. A signal processing circuit can be constructed to track the magnitude envelope of this analog speech signal, and by observing when the magnitude decreases to a low level, recognize that the speech segment has ended. It should be noted that the presence of an RF carrier will normally persist past the point that the speech segment ends due to the fact that for voice communications, the RF transmitter is typically manually keyed by a human operator who activates a switch generally known as a Push to Talk (PTT) switch.

If the received communication is a data communication waveform, recognition of an incomplete receive operation may include a process similar to the previously described voice waveform involving identifying the presence of an RF carrier by analysis of noise quieting. An ongoing receive operation on a data communication waveform may also be recognized by using knowledge of the data format associated with the particular waveform. Data communication waveforms typically have a predetermined layout of data blocks or packets that may be used to identify when the receive operation will be complete. The RF carrier may persist past the point of the end of the data transmission, but this will typically be short due to the non-manual nature of the transmitter activation by the data communication equipment.

Further, the method 100 may include detecting the beginning of the speech message 106 and delaying the speech message for a selected amount of time 108. In an embodiment, delaying the speech message a selected amount of time includes delaying the speech message until the receive operation is completed. Delaying the speech message may be accomplished using well known digital sampling, storage and playback techniques. In another embodiment, the speech message may be delayed up to some maximum amount to correspond to required communications performance, allowing receive and transmit operations to be coordinated, and thus reducing the possibility of the receiver to be interrupted or affected by the transmitter operating on a frequency that may cause interference (e.g., adjacent transmit and receive frequencies). For example, the speech message may be delayed between approximately 0.25 seconds to 0.50 seconds. Further, if conditions allow, the speech message delay may be increased beyond approximately 0.50 seconds by increasing the rate of the speech message without shifting speech pitch using well known digital signal processing techniques. Such additional delay may be desired if additional time is needed to coordinate receive and transmit operations. It is contemplated that the present method may be implemented in various types of systems including an integrated avionics system with communication, navigation, and/or surveillance capabilities in an aircraft with complete interoperability with existing ground infrastructure.

In additional embodiments, delaying the speech message for a selected amount of time may include delaying a lower priority speech message until a higher priority transmission has been completed. In such embodiments, the speech message may be stored and queued for immediate transmission once the higher priority transmission has been completed. This configuration may be desirable to implement during periods when interference from simultaneous transmissions is probable.

Figure 2:
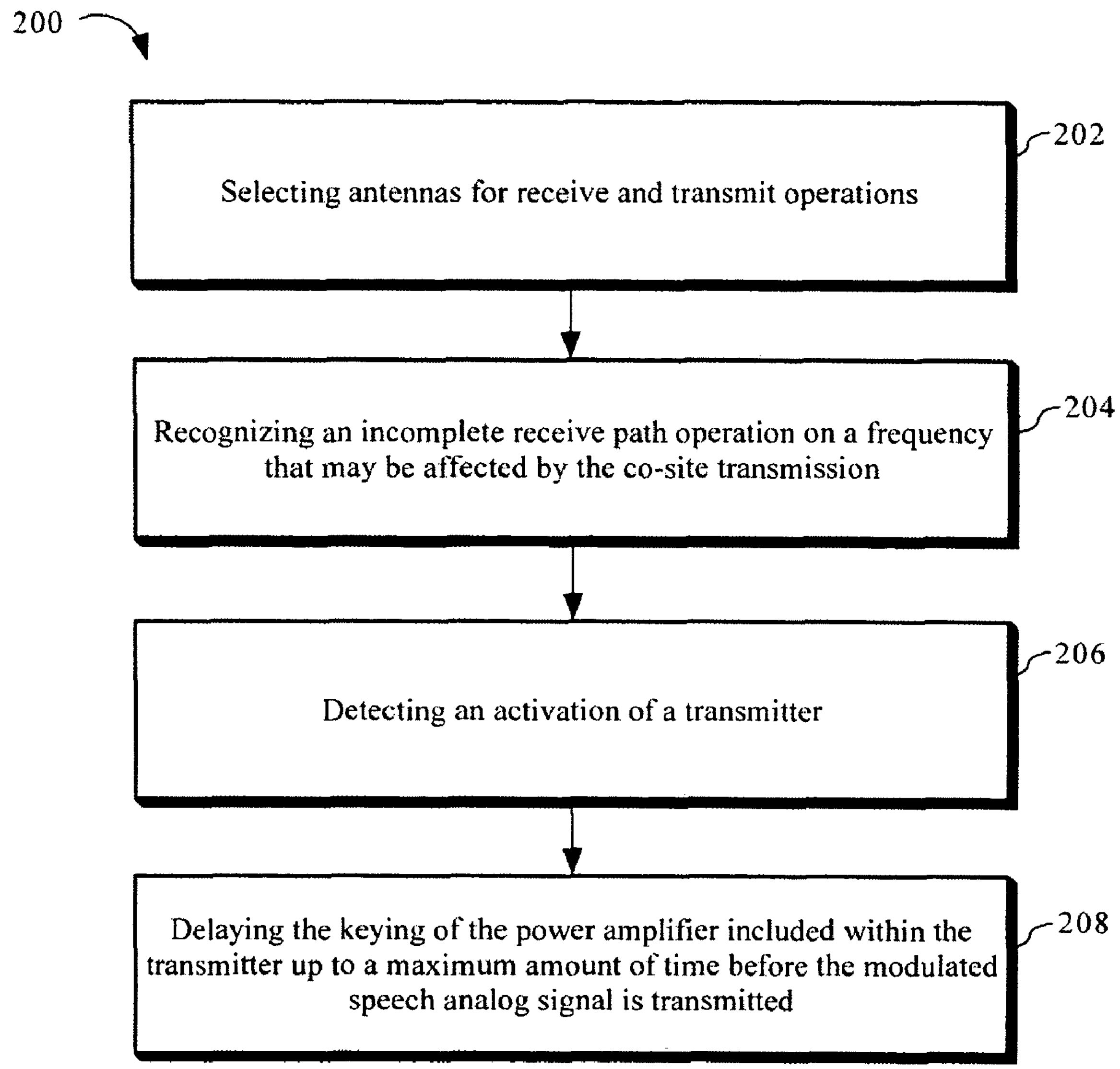
FIG. 2 is a flow diagram of an additional method for coordinating receive and transmit operations in accordance with an exemplary embodiment of the present invention.

Referring to FIG. 2, an additional method 200 for coordinating receive and transmit operations is disclosed. The method 200 allows transmissions to be controlled by introducing a period of delay from the time a user attempts to activate a transmitter until the transmitter is activated and the voice signal is transmitted. In an exemplary embodiment, the method 200 may include selecting antennas for receive and transmit operations 202 and recognizing an incomplete receive path operation on a frequency 204 that may be affected by a transmission as previously described. For instance, the selecting of the optimal antennas may occur prior to recognizing an incomplete receive path operation. Further, such method 200 may involve detecting an activation of a transmitter 206. In an embodiment, a user activates the transmitter by pressing a Push to Talk (PTT) switch.

In addition, the method 200 may include delaying the activation of a power amplifier up to a maximum time before a speech analog signal begins 208. In an embodiment, the power amplifier is disposed within the transmitter for amplifying the modulated speech analog signal. Further, delaying the keying of the power amplifier up to a maximum time before the modulated speech analog signal begins 208 may include delaying a lower priority speech message transmission until a higher priority transmission has been completed. Moreover, in an additional embodiment, the delay may last until a receive operation is completed, a critical function, aircraft operation, or mission phase is completed, or as dictated by communication performance guidelines. For example, such guidelines may require the delay to last for approximately 0.25 seconds to approximately 0.50 seconds.

It is contemplated that the present method 200 may be implemented in various types of systems including an integrated avionics system with communication, navigation, and/or surveillance capabilities in an aircraft with complete interoperability with existing ground infrastructure.

Figure 3:
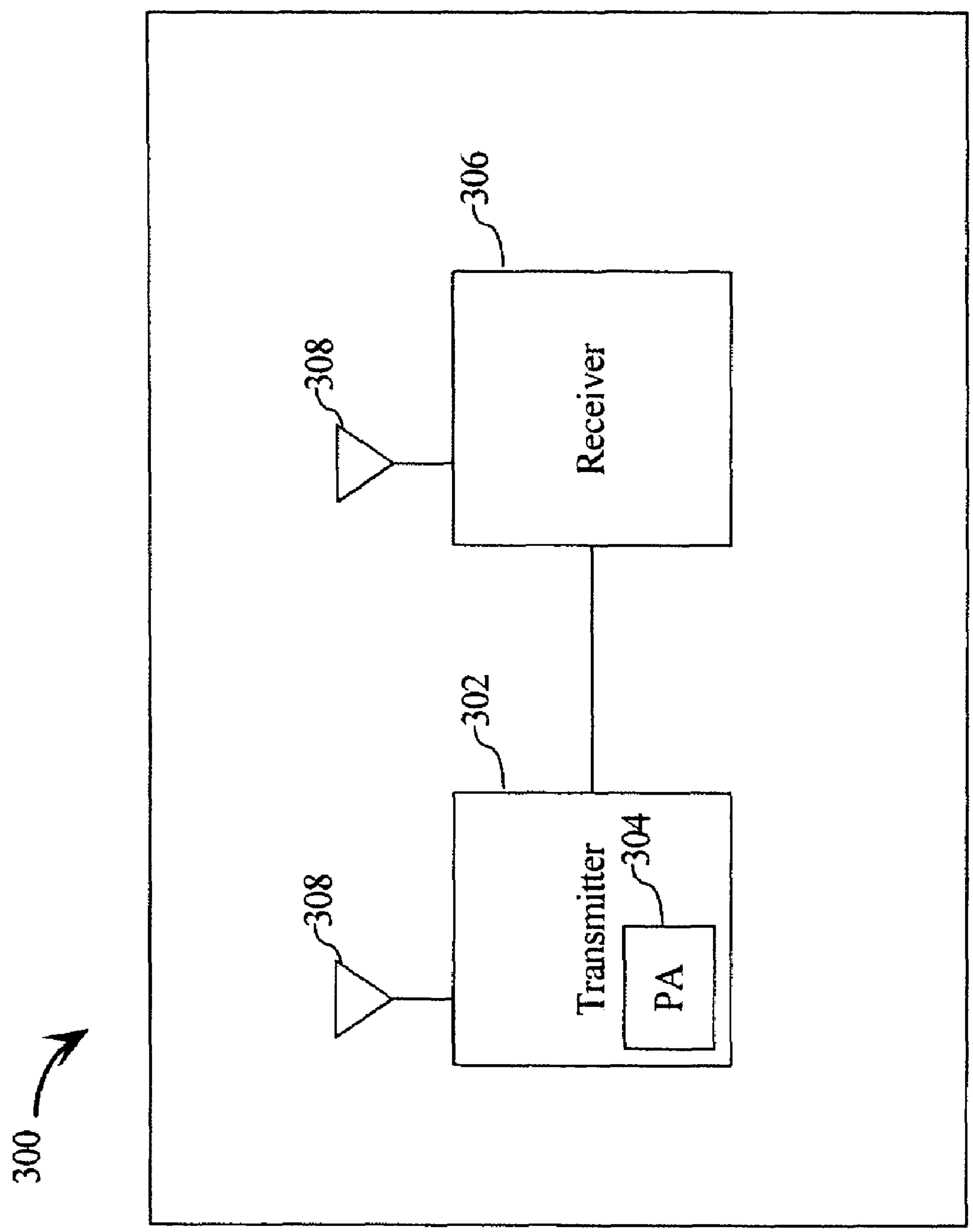
FIG. 3 is a block diagram of a system for coordinating receive and transmit operations in accordance with an exemplary embodiment of the present invention.

Referring to FIG. 3, a system 300 for managing receive and transmit operations is provided. For example, the present system 300 may be utilized to manage high-powered transmitters located in close proximity to sensitive receivers. In an exemplary embodiment, the system 300 may include at least one transmitter 302 for transmitting a modulated speech analog signal. Further, the transmitter 302 may include a power amplifier (PA) 304 for amplifying the modulated and frequency translated speech analog signal. Moreover, the system 300 may include at least one receiver 306 for receiving an independent received communication signal that may be associated with any of communication, navigation and/or surveillance waveforms. Antennas 308 for receive and transmit operations may be included on the at least one receiver 306 and the at least one transmitter 302, respectively. It is contemplated that the system 300 may be integrated to include communication, navigation, and/or surveillance functions in an aircraft. Such aircraft may be configured to have complete interoperability with existing ground infrastructure.

The speech analog signal in the system 300 may be delayed an amount of time up to a maximum, allowing receive and transmit operations to be coordinated and to minimize the interference between the transmitter and the receiver when located in close proximity to each other. The speech analog signal may be delayed for a period of time according to required communication performance guidelines, until a receive operation on some other waveform is complete or according to other operational requirements. For instance, the selected amount of time before the speech analog signal begins to transmit may vary between approximately 0.25 seconds up to approximately 0.50 seconds. In addition, the delay time for the speech analog signal may depend upon the priority assigned to the signal. For example, a lower priority speech analog signal may be delayed until a higher priority signal transmission has been completed.

Although the present system 300 is illustrated to include a transmitter and a receiver, it is to be understood that the system 300 may include multiple receivers and transmitters depending upon the operational requirements of the system. In an embodiment with multiple receivers and transmitters, the same concept may be applied to the multiple transmitters to provide coordinated management of transmissions to avoid interference in the receivers by the transmit signal or signals. Some types of receiver interference may be caused by intermodulation between two or more simultaneous transmit signals.

Figure 4:
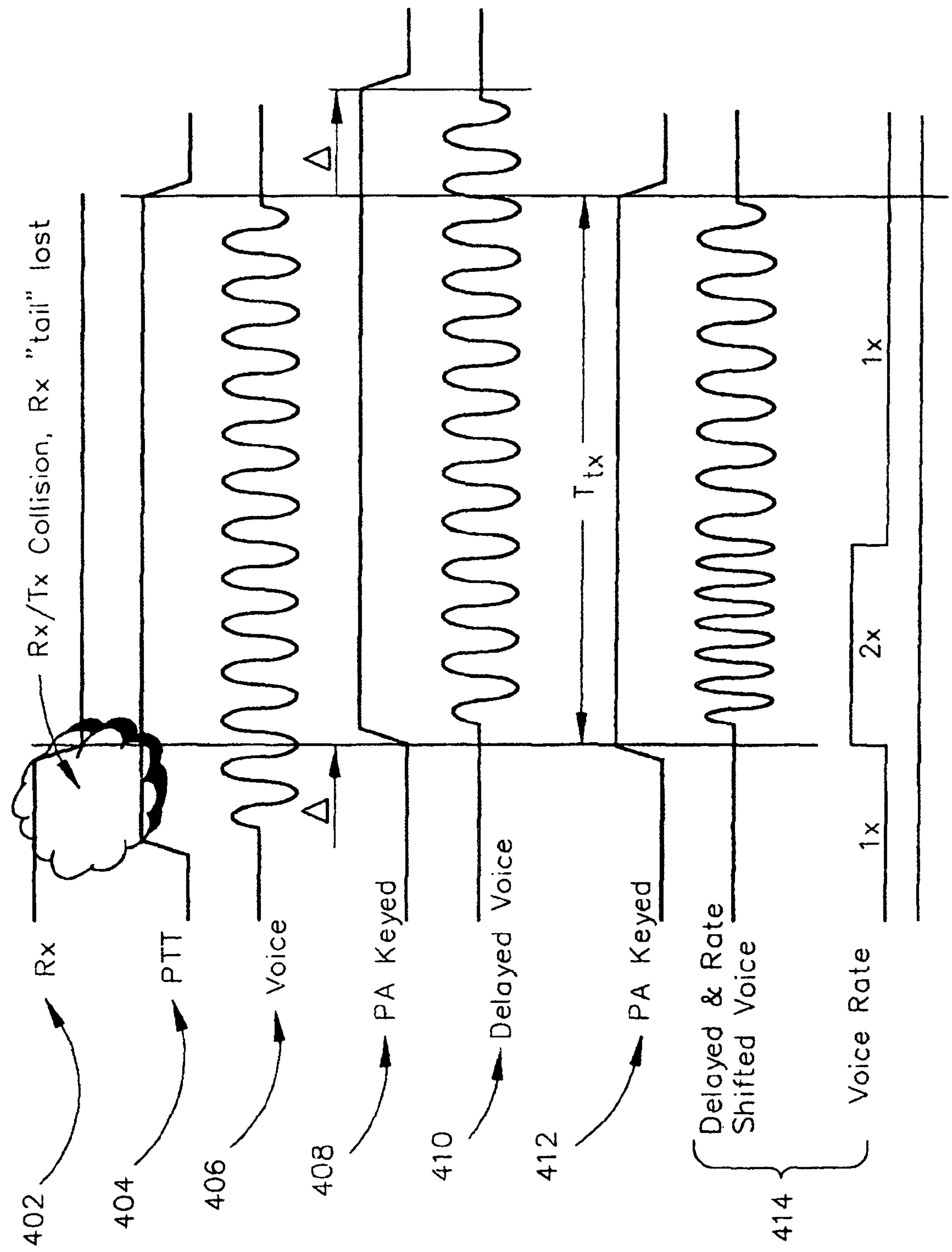
FIG. 4 is a schematic diagram illustrating the process of coordinating receive and transmit operations in accordance with an exemplary embodiment of the present invention.

Referring to FIG. 4, an illustration of the aforementioned described methods and system implemented for coordinating receive and transmit operations in accordance with an exemplary embodiment of the present invention is provided. As illustrated in FIG. 4, a receive operation 402 is in progress. The receive and transmit operations will collide if the user attempts to activate the transmitter (e.g., the user presses a Push to Talk (PTT) switch 404 with no coordination with the receive operation. A voice signal 406 will be transmitted immediately upon keying of a power amplifier (PA) 408 which will result in the trailing portion of the received signal being lost, a condition colloquially labeled "stepping on" a message.

As illustrated in 410, delaying both the voice signal and activation of the power amplifier 412 allows the message to be transmitted without colliding with the ongoing and incomplete received signal 402. The amount of voice delay as denoted in 410 may be extended by an increase in the voice rate for at least a portion of the voice signal transmit time until the voice in (receive) to the voice out (transmit) operation have become synchronized (e.g., "caught up"). As illustrated in steps 412 and 414, once the power amplifier is keyed, the voice signal may be transmitted ($T_x$) initially, for example, at a rate twice that (2×) at which it was received. Further, the latter portion of such signal may then be decreased to a transmit rate equal to that in which it was received (1×). As illustrated in step 414, such manipulation results in a complete transmission. In a preferred embodiment, the increase in voice rate occurs without shifting voice pitch.

It is contemplated that the disclosed system and method may be implemented within a software-defined communication radio system including Joint Tactical Radio System (JTRS), Future Combat System (FCS), or similar software-defined radios. It is further contemplated that the disclosed system and method may be supported by avionics architectures including Integrated Modular Avionics (IMA) and Multi-Mode Multi-Function Avionics (MMDA). JTRS as well as FCS are a family of software defined radios that provide military users with voice, data and video communications as well as interoperability across the joint battle space. Such systems may be deployed in airborne platforms as well as selected maritime, fixed-station, and ground mobile platforms. The disclosed system and method are not, however, limited to these software-defined radios.

It is further contemplated that the currently disclosed methods and system provide more efficient overall channel utilization when compared to conventional control methods because more information may be communicated on a given channel per given unit of time since less transmit time is required for each individual voice message.

It is to be noted that the foregoing described embodiments according to the present invention may be conveniently implemented using conventional general purpose digital computers and digital signal processors programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that portions of the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for coordinating receive and transmit operations in a communication system, comprising:

recognizing an incomplete receive operation on a frequency that may be affected by a co-site transmit operation;

detecting the beginning of a speech message to be transmitted; and delaying the speech message a time up to a maximum amount to allow receive and transmit operations to be coordinated, wherein the speech message delay is determined based upon the total system operational requirements including both receive and transmit functions, whereby the delay may be greater than approximately 0.50 seconds.

2. The method of claim 1, wherein the method is implemented in at least one of an integrated communication, navigation or surveillance system in an aircraft.

3. The method of claim 1, wherein the method is implemented in avionics architectures including at least one of a joint tactical radio system (JTRS) architecture, integrated modular avionics (IMA) architecture or multi-mode multi-function digital avionics (MMDA) architecture.

4. The method of claim 1, wherein the speech message is delayed up to a pre-determined limit to allow receive and transmit operations to be coordinated to simultaneously satisfy the operational performance required for both transmit and receive functions.

5. The method of claim 1, further comprising increasing the rate at which at least a portion of the speech message is transmitted.

6. The method of claim 1, wherein the delaying of a speech message a selected amount of time includes delaying a lower priority speech message until a higher priority transmission has been completed.

7. The method of claim 1, wherein the delaying of a speech message a selected amount of time includes delaying the speech message until the receive operation is completed.

8. The method of claim 1, wherein the method to reduce the impact of co-site transmit interference also includes antenna selection for at least one of the transmit or receive functions.

9. The method of claim 8, wherein the method of antenna selection includes evaluating at least one of receive-transmit isolation, link margin, priority, and frequencies.

10. A method for coordinating receive and transmit operations in a communication system, comprising:

selecting antennas for receive and transmit operations;

recognizing an incomplete receive operation on a frequency that may be affected by a co-site transmit operation after selecting antennas for receive and transmit operations;

detecting initiation of operation of a transmitter, the transmitter including a power amplifier for amplifying a modulated speech analog signal; and delaying the operation of the transmitter.

11. The method of claim 10, wherein the method is implemented in at least one of an integrated communication, navigation or surveillance system in an aircraft.

12. The method of claim 10, wherein the method is implemented in avionics architectures including at least one of a joint tactical radio system (JTRS) architecture, integrated modular avionics (IMA) architecture or multi-mode multi-function digital avionics (MMDA) architecture.

13. The method of claim 10, wherein the speech analog signal is delayed up to a pre-determined limit based upon the required operational performance.

14. The method of claim 10, wherein the speech analog signal delay is determined based upon the total system operational requirements including both receive and transmit functions, whereby the delay may be greater than approximately 0.50 seconds.

15. The method of claim 10, wherein delaying initiation of operation of the power amplifier includes delaying a lower priority speech transmission until a higher priority transmission has been completed.

16. The method of claim 10, wherein delaying initiation of operation of the transmitter includes delaying the speech message until the receive operation is completed.

17. The method of claim 10, wherein the method to reduce the impact of co-site transmit interference also includes antenna selection for at least one of the transmit or receive functions.

18. The method of claim 17, wherein the method of antenna selection includes evaluating at least one of receive-transmit isolation, link margin, priority, and frequencies.

19. A communication system, comprising:

a transmitter for transmitting a modulated speech analog signal, the transmitter including a power amplifier for amplifying the modulated speech analog signal; and a receiver communicatively coupled to the transmitter for receiving a communication signal, wherein the speech analog signal is delayed up to a maximum amount of time corresponding to required communications performance, allowing receive and transmit operations to be coordinated and to minimize the interference between the transmitter and the receiver when located in close proximity to each other, the speech analog signal delay is determined based upon the total system operational requirements including both receive and transmit functions, whereby the delay may be greater than approximately 0.50 seconds.

20. The system of claim 19, wherein the system is at least one of an integrated communication, navigation or surveillance system in an aircraft.

21. The system of claim 19, wherein the system is implemented in avionics architectures including at least one of a joint tactical radio system (JTRS) architecture, integrated modular avionics (IMA) architecture or multi-mode multi-function digital avionics (MMDA) architecture.

22. The system of claim 19, wherein the amount of time before the speech analog signal begins is delayed up to a pre-determined limit based upon the required operational performance.

23. A method for coordinating receive and transmit operations in a communication system, comprising:

recognizing an incomplete receive operation on a frequency that may be affected by a co-site transmit operation;

detecting the beginning of a speech message to be transmitted; and delaying the speech message a time up to a maximum amount to allow receive and transmit operations to be coordinated, wherein the delaying of a speech message a selected amount of time includes delaying a lower priority speech message until a higher priority transmission has been completed.

24. A method for coordinating receive and transmit operations in a communication system, comprising:

recognizing an incomplete receive operation on a frequency that may be affected by a co-site transmit operation;

detecting initiation of operation of a transmitter, the transmitter including a power amplifier for amplifying a modulated speech analog signal; and delaying the operation of the transmitter, wherein the speech analog signal delay is determined based upon the total system operational requirements including both receive and transmit functions, whereby the delay may be greater than approximately 0.50 seconds.

25. A method for coordinating receive and transmit operations in a communication system, comprising:

recognizing an incomplete receive operation on a frequency that may be affected by a co-site transmit operation;

detecting initiation of operation of a transmitter, the transmitter including a power amplifier for amplifying a modulated speech analog signal; and delaying the operation of the transmitter, wherein delaying initiation of operation of the power amplifier includes delaying a lower priority speech transmission until a higher priority transmission has been completed.

* * * * *